US010597820B2

(12) United States Patent
Tan et al.

(10) Patent No.: US 10,597,820 B2
(45) Date of Patent: Mar. 24, 2020

(54) METHOD OF MAKING BLEACHED MICROCRYSTALLINE CELLULOSE

(71) Applicant: DUPONT NUTRITION USA, INC., Wilmington, DE (US)

(72) Inventors: Zheng Tan, Ewing, NJ (US); Simon Eustace, Lincoln University, PA (US); Michael Sestrick, Yardley, PA (US); Jeremy Ondov, New York, NY (US)

(73) Assignee: DuPont Nutrition USA, Inc.

(*) Notice: Subject to any disclaimer, the term of this patent is extended or adjusted under 35 U.S.C. 154(b) by 3 days.

(21) Appl. No.: 15/568,375

(22) PCT Filed: May 6, 2016

(86) PCT No.: PCT/US2016/031086
§ 371 (c)(1),
(2) Date: Oct. 20, 2017

(87) PCT Pub. No.: WO2016/182867
PCT Pub. Date: Nov. 17, 2016

(65) Prior Publication Data
US 2018/0119346 A1    May 3, 2018

Related U.S. Application Data

(60) Provisional application No. 62/161,545, filed on May 14, 2015.

(51) Int. Cl.
| D21C 9/16 | (2006.01) |
| D21C 9/00 | (2006.01) |
| D21C 1/04 | (2006.01) |
| D21C 9/10 | (2006.01) |
| C08B 15/02 | (2006.01) |
| C08B 15/08 | (2006.01) |

(52) U.S. Cl.
CPC .............. D21C 9/163 (2013.01); C08B 15/02 (2013.01); C08B 15/08 (2013.01); D21C 1/04 (2013.01); D21C 9/00 (2013.01); D21C 9/002 (2013.01); D21C 9/004 (2013.01); D21C 9/007 (2013.01); D21C 9/1015 (2013.01); D21C 9/1052 (2013.01); D21C 9/1057 (2013.01); D21C 9/16 (2013.01)

(58) Field of Classification Search
CPC . D21C 1/04; D21C 9/00; D21C 9/002; D21C 9/004; D21C 9/007; D21C 9/1015; D21C 9/1052; D21C 9/1057; D21C 9/16; D21C 9/163; D21C 3/04; D21C 9/02; D21C 9/14; C08B 15/02; C08B 15/08; C08L 1/04

See application file for complete search history.

(56) References Cited

U.S. PATENT DOCUMENTS

| 2,978,446 | A | * | 4/1961 | Battista | .................. C03C 17/32 536/56 |
| 3,023,104 | A | * | 2/1962 | Battista | .................. C08B 15/08 426/531 |
| 3,146,168 | A | * | 8/1964 | Battista | ................ A61K 9/0014 424/526 |
| 3,954,727 | A | * | 5/1976 | Toshkov | ................. C08B 15/02 536/57 |
| 6,228,213 | B1 | * | 5/2001 | Hanna | ..................... C08B 15/02 127/37 |
| 6,392,034 | B1 | * | 5/2002 | Trusovs | .................... C08B 1/00 536/124 |
| 7,005,514 | B2 | | 2/2006 | Nguyen | |
| 9,096,692 | B2 | * | 8/2015 | Dahl | ........................ C08B 15/02 |
| 9,587,038 | B2 | * | 3/2017 | Rasanen | ................ C08B 15/02 |
| 2002/0139498 | A1 | * | 10/2002 | Matheson | ............... C08B 15/02 162/76 |
| 2003/0089465 | A1 | * | 5/2003 | Schaible | ................. C08B 15/02 162/19 |
| 2003/0131957 | A1 | * | 7/2003 | Schaible | ................. C08B 15/02 162/65 |
| 2004/0074615 | A1 | * | 4/2004 | Nguyen | .................... C08B 1/00 162/9 |
| 2005/0145351 | A1 | * | 7/2005 | Schaible | ................. C08B 15/02 162/9 |
| 2005/0239744 | A1 | * | 10/2005 | Ioelovich | ................ C08B 15/02 514/57 |
| 2006/0020126 | A1 | * | 1/2006 | Kopesky | ................. C08B 15/02 536/30 |
| 2006/0096500 | A1 | * | 5/2006 | Tuason | ................... A23C 9/137 106/162.1 |
| 2006/0201642 | A1 | * | 9/2006 | Shin | ...................... D21C 9/1005 162/67 |
| 2006/0219376 | A1 | * | 10/2006 | Luo | ......................... C08B 15/02 162/87 |
| 2006/0223992 | A1 | * | 10/2006 | Luo | ......................... C08B 15/02 536/56 |
| 2012/0223165 | A1 | * | 9/2012 | Buente Alonso | ....... C08B 15/02 241/15 |

(Continued)

FOREIGN PATENT DOCUMENTS

| CA | 2537033 A1 * | 9/2006 | ........... D21C 9/1005 |
| CN | 103223547 A * | 7/2013 | |

(Continued)

OTHER PUBLICATIONS

Machine Translation of CN-103223547 A (Year: 2013).*

(Continued)

*Primary Examiner* — Jose A Fortuna

(57) ABSTRACT

A method of producing bleached microcrystalline cellulose which method comprises neutralizing or alkalizing an acidic microcrystalline production reaction mixture slurry, typically produced by acid hydrolysis or by electronic beam irradiation, followed by adding an oxidant to such reaction mixture. This practice of this method permits the production of microcrystalline cellulose having desirable color stability as well as compression characteristics suitable for pharmaceutical binder use from paper grade and other low purity pulps.

14 Claims, No Drawings

(56) References Cited

U.S. PATENT DOCUMENTS

| | | | |
|---|---|---|---|
| 2013/0090391 A1* | 4/2013 | Tan | A23L 2/52 |
| | | | 514/781 |
| 2013/0276801 A1* | 10/2013 | Byrd, Jr. | C08H 8/00 |
| | | | 131/297 |
| 2015/0231260 A1* | 8/2015 | Rojas Camargo | A61K 47/38 |
| | | | 514/781 |
| 2018/0119346 A1* | 5/2018 | Tan | C08B 15/02 |
| 2018/0369394 A1* | 12/2018 | Yang | A61K 8/0241 |
| 2019/0023857 A1* | 1/2019 | Shin | C08B 1/003 |
| 2019/0075807 A1* | 3/2019 | Yang | A23L 29/262 |

FOREIGN PATENT DOCUMENTS

| | | | | |
|---|---|---|---|---|
| CN | 104294693 A | * | 1/2015 | |
| EP | 1707669 A2 | * | 10/2006 | C08B 15/02 |
| WO | WO-9915564 A1 | * | 4/1999 | C08B 15/02 |
| WO | WO-2004011501 A1 | * | 2/2004 | C08B 15/02 |
| WO | WO-2012021056 A1 | * | 2/2012 | C08B 15/02 |

OTHER PUBLICATIONS

Machine Translation of CN-104294693 A (Year: 2015).*

E G Kazakova et al. in "Preparation of powder cellulose," Russian Journal of Applied Chemistry, 2009, vol. 82, No. 6, pp. 1090-1094. (Year: 2009).*

E G Kazakova et al. in "A new procedure for preparing microcrystalline cellulose," Russian Journal of Applied Chemistry, 2009. vol. 82, No. 3 pp. 496-499. (Year: 2009).*

International Preliminary Report on Patentability, international application No. PCT/US2016/031086, international filing date May 6, 2016.

Written Opinion for international application No. PCT/US2016/031086, international filing date May 6, 2016.

International Search Report for international application No. PCT/US2016/031086, international filing date May 6, 2016.

* cited by examiner

METHOD OF MAKING BLEACHED MICROCRYSTALLINE CELLULOSE

FIELD OF THE INVENTION

The present invention is directed to a method of producing bleached microcrystalline cellulose which method comprises neutralizing or alkalizing an acidic microcrystalline production reaction mixture slurry, typically produced by acid hydrolysis or by electronic beam irradiation, followed by adding an oxidant to such reaction mixture. This practice of this method permits the production of microcrystalline cellulose having desirable color stability as well as compression characteristics suitable for pharmaceutical binder use from paper grade and other low purity pulps.

BACKGROUND OF THE INVENTION

Microcrystalline cellulose, also known as MCC or cellulose gel, is commonly used in the food industry to enhance the properties or attributes of a final food product. For example, it is used as a binder or further processed into colloidal stabilizer in food applications, including in beverages, bakery fillings, frozen desserts, jams, soups and sauces, and the like. It is also widely used as a binder and disintegrant in pharmaceutical tablets, as a suspending agent in liquid pharmaceutical formulations, and as a binder, disintegrant, and processing aid in industrial applications, in household products such as detergent and/or bleach tablets, in agricultural formulations, and in personal care products such as toothpastes and cosmetics.

Microcrystalline cellulose is typically produced by treating a source of cellulose, preferably alpha cellulose in the form of pulp from fibrous plant materials, with a mineral acid, preferably hydrochloric acid (acid hydrolysis). The acid selectively attacks the less ordered regions of the cellulose polymer chain thereby exposing and freeing the crystalline sites which form crystallite aggregates which constitute the microcrystalline cellulose. These are then separated from the reaction mixture, and washed to remove degraded by-products.

The classic process for MCC production is acid hydrolysis of purified cellulose, pioneered by O. A. Battista (U.S. Pat. Nos. 2,978,446; 3,023,104; and 3,146,168). In efforts to reduce the cost while maintaining or improving the quality of MCC, various alternative processes have been proposed. Among these are steam explosion (U.S. Pat. No. 5,769,934; Ha et al.), reactive extrusion (U.S. Pat. No. 6,228,213; Hanna et al.), and reaction in a reactor pressurized with oxygen and/or carbon dioxide gas and operating at 100 to 200° C. (U.S. Pat. No. 5,543,511; Bergfeld et al.).

While it is known in the art that electron beam treatment depolymerizes cellulosic materials, the production of a functional MCC with good tableting performance and good whiteness may be made by electron beam treatment of cellulosic pulps, especially low cost pulps, has not yet been achieved. Industrial scale electron beam accelerators are used for the treatment. There are generally 3 types of industrial scale electron beam machines: the high voltage (>5 MeV); the medium voltage (400 keV to 5 Mev); and the low voltage (80 keV to 300 keV, sometimes up to 500 keV) machines. A description of electron beam machines useful for the treatment of cellulosic pulps is found in "Industrial Radiation Processing with Electron Beams and X-rays", 1 May 2011-revision 6 by IAEA and International Irradiation Association. Among all the machines, two lower cost systems of handling rolls (pulp rolls) are of particular interest: (1) IBA Industrial's Easy-e-Beam self-shielded 800 kev100 mA system or its modifications; (2) ESI's low energy EB equipment (which might optionally require two-sided or multi-pass treatment due to penetration depth limitations). The electron beam depolymerization can be done with the irradiation dose between 1 MRad to 15 MRad, preferably between 2 MRad to 15 MRad. Although electron beam treatment may be carried in either wet or dry state, it is typically preferable that the treatment be done on dry or substantially dry cellulosic materials.

In order to be employed as a binder in pharmaceutical applications, it is necessary that MCC possess certain properties including a high degree of whiteness and exhibit desirable tablet compaction properties. In order to obtain MCC exhibiting these properties, the starting cellulosic materials for the commercial production of MCC are predominantly dissolving wood pulps (with alpha-cellulose content higher than 92%). Accordingly, it would be desirable to possess a process for producing MCC suitable for use as pharmaceutical binders from lower cost pulps such as paper grade pulps and others having an alpha-cellulose content below that of the dissolving wood pulps currently employed.

In the past, it has been proposed to enhance the whiteness of MCC produced from such lower cost pulps by conducting bleaching at various stages under different conditions. Thus, U.S. Patent Application 2005/0145351 (Schaible et al) proposes a one step process for producing microcrystalline cellulose which simultaneously hydrolyzing, de-polymerizing and bleaching wood pulp by adding an activated oxygen compound under acid conditions. Somewhat similarly, PCT Patent Application WO 2004/011501 (Kopesky et al) discloses a process for microcrystalline cellulose by subjecting pulp to high shear and temperature conditions while reacting with an active oxygen compound (preferably hydrogen peroxide) under acidic conditions. However, it is well known that acidic peroxide will generate substantial amounts of aldehyde, ketone and some carboxyl groups on cellulosic pulp, leading to color reactions and/or potential reactive interactions with pharmaceutical drugs (API) if used in tablets. Further, it is also well known in the art of hydrogen peroxide bleaching of pulps, that acidic peroxide may present safety hazards in commercial operations due to unstable pockets of un-reacted peroxide.

U.S. Pat. No. 6,392,034 (Trusovs) discloses a process to produce MCC comprising treating a cellulose source material with alkali swelling; followed by hydrogen peroxide to reduce viscosity. The solution is filtered to isolate alkali MCC which is then neutralized by treatment with acid.

U.S. Pat. No. 6,228,213 (Hanna et al) discloses a process wherein MCC is produced by acid hydrolysis, neutralized and washed; then bleached with hydrogen peroxide. Somewhat similarly, U.S. Pat. No. 3,954,727 (Toshkov et al) discloses a process wherein acid hydrolyzed MCC is separated from the hydrolysate, washed, alkalized to pH 9 and bleached with hydrogen peroxide. Unfortunately, the MCC produced by such post-isolation bleaching processes has to be subjected to a further washing step in order to avoid having it discolor over a period of time.

Accordingly, it is unexpected that microcrystalline cellulose with desirable long-lasting color and tableting qualities could be prepared by a process in which an oxidant, preferably hydrogen peroxide, is added to a previously acidic microcrystalline cellulose production reaction mixture, after first neutralizing or alkalizing such reaction mixture.

SUMMARY OF THE INVENTION

The present invention is directed to a method of making microcrystalline cellulose comprising the steps of:

a) Providing a cellulosic pulp and subjecting such pulp to a microcrystalline cellulose production process to create an acidic product reaction mixture slurry;

b) Adding a sufficient amount of an alkaline material to the acidic product reaction mixture slurry to produce a neutralized product reaction mixture slurry having a pH of between 7 and 12;

c) Adding oxidant to the neutralized product reaction mixture form a bleached product reaction mixture comprising bleached microcrystalline cellulose; and d) Isolating the bleached microcrystalline cellulose from the bleached product reaction mixture.

This practice of this method permits the production of microcrystalline cellulose having desirable color stability and exhibiting compression characteristics suitable for pharmaceutical binder use from paper grade and other low purity pulps.

DETAILED DESCRIPTION OF THE INVENTION

The present invention is directed to a method of making microcrystalline cellulose comprising the steps of:

a) Providing a cellulosic pulp and subjecting such pulp to a microcrystalline cellulose production process to create an acidic product reaction mixture slurry;

b) Adding a sufficient amount of an alkaline material to the acidic product reaction mixture slurry to produce a neutralized product reaction mixture having a pH of between 7 and 12;

c) Adding oxidant to the neutralized product reaction mixture to form a bleached product reaction mixture comprising bleached microcrystalline cellulose; and d) Isolating the bleached microcrystalline cellulose from the bleached product reaction mixture.

In the first step of the process of this invention, a cellulosic pulp material is subjected to a microcrystalline cellulose production process to form an acidic product reaction mixture. Typically, this involves the acid hydrolysis of the pulp material, although electron beam processes may be employed as well. In those embodiments in which a dry electron beam process is employed, water is added to the radiation product in order to produce the acidic reaction product slurry.

The acid hydrolysis process which may be employed to produce the acidic product reaction mixture slurry includes both conventional acid hydrolysis (e.g. those processes described in U.S. Pat. Nos. 2,978,446, 3,023,104 and 3,146,168) as well as other known acid hydrolysis processes for making MCC. Such methods may include $SO_2$/sulfurous acid, oxalic acid, trifluoroacetic acid (TFA), uric acid, trifluoromethanesulfonic acid, 4-methylbenzenesulfonic acid, poly (4-vinylbenzenesulfonic acid), acidic metal salts such as zinc chloride, ferrous sulfate, ferric chloride, copper sufate/chloride, vanadyl sulfate, and polyoxometallate (heteropoly acids) including but not limited to Keggin acids such as $H_3PW_{12}O_{40}$, $H_4PW_{11}VO_{40}$, $H_4SiW_{12}O_{40}$, $H_3PMo_{12}O_{40}$, and $H_4SiMo_{12}O_{40}$, etc.

Similarly, the process of producing microcrystalline cellulose from cellulosic pulps employing electron beams is understood by one of skill in the art.

The source pulp employed as starting material may be obtained from a wide variety of sources. Examples include, but not limited to, bleached, semi-bleached, or unbleached Kraft pulps, high kappa Kraft (liner board) pulps, bleached or unbleached sulfite pulps, soda cooking pulps, (organic) solvent pulping pulps, semi-chemical pulping pulps, fluff pulps, softwood pulps, hardwood pulps, Eucalyptus pulps, sawdust pulps, non-wood pulps such as from straws, rice straws, wheat straws, corn straws/stalks, hemp, kenaf, ramie, bamboo, baggasse, abaca, rice husks, peanut shells, various other agriculture cellulosic residues, fruit fibers, citrus peels, beet fibers, tree barks, algae or seaweed celluloses, old corrugated container pulps (OCC), recycled paper pulps and mixtures thereof. Specific wood pulps which may be employed include northern bleached softwood kraft (NBSK), southern bleached softwood kraft SBSK, bleached hardwood kraft (BHK), bleached eucalyptus kraft (BEK), and various sulfite pulps.

In certain embodiments, the pulps employed will possess an alpha cellulose content of less than 92% by weight, and even lower than 90% by weight, based upon the total weight of the pulp material. Notwithstanding this, it is understood that dissolving pulps having an alpha cellulose content of 92% or more may also be employed as the starting material.

The source pulp may also have been subjected to various treatment/pretreatments, such as but not limited to: prior acid hydrolysis, partial depolymerization, oxidative treatment, UV/electron beam treatment, catalytic chemical treatment, enzymatic treatment, mechanical treatment. Particular examples include "recalcitrant" cellulose residue from enzymatic treatment such as from biorefinery processes; and depolymerized or partially depolymerized pulp (either chemically or by electron beam.

The microcrystalline cellulose production process of step a results in the production of an acidic product reaction mixture slurry. When an acid hydrolysis process is employed, this reaction product mixture is in the form of a microcrystalline cellulose slurry comprising microcrystalline cellulose and hydrolysate liquor. When an electron beam process is employed, water may be added in order to produce an acidic product reaction mixture slurry.

In step b, the acidic product reaction mixture slurry has its pH raised to between 7 and 12 by the addition of alkaline material, thereby forming a neutralized product reaction mixture. Any alkaline material may be employed, with sodium hydroxide, ammonia, potassium hydroxide, lithium hydroxide, sodium carbonate, and calcium hydroxide, calcium oxide and mixtures thereof typically being used. More typically, sodium hydroxide is employed. The amount of alkaline material added will vary depending upon a number of factors including the particular microcrystalline production process employed in step a, the particular alkaline material employed, and the like. However, one of ordinary skill in the art can easily determine the appropriate amount of alkaline to be added by routine experimentation.

Once the pH has been raised to the desired range, in step c of the present process an oxidant is added to the neutralized product reaction mixture to react to form a bleached product reaction mixture. Oxidants useful in the process of the invention are compounds which are non-gaseous at standard temperature and pressure, and include one or more of hydrogen peroxide, peroxy acids, peroxy esters and hydroperoxides; inorganic peroxides such as alkali metal salts of peroxymonosulfuric acid and peroxydisulfuric acid, and the corresponding ammonium and potassium persalts, potassium peroxydiphosphate; salts of peroxymonophosphoric acid, peroxydiphosphoric acid, peroxytitanic acid, peroxydistannic acid, peroxydigermanic acid and peroxychromic acid; and organic peroxides such as sodium peroxymonocarbonate, potassium peroxydicarbonate, peroxyoxalic acid, peroxy formic acid, peroxy benzoic acid, peroxy acetic acid (peracetic acid), benzoyl peroxide, oxaloyl peroxide, lauroyl peroxide, acetyl peroxide, t-butyl peroxide, t-butyl peracetate, t-butyl peroxy pivalate, cumene hydroperoxide, dicumyl peroxide, 2-methyl pentanoyl peroxide, and the like, including mixtures of two or more thereof.

A preferred oxidant is hydrogen peroxide, which is typically supplied as an aqueous solution. Any concentration can be used, such as commercial grades ranging from about 30 weight percent to about 70 weight percent.

The oxidant is added in an amount sufficient to bleach the microcrystalline cellulose present in the neutralized reaction mixture to the desired extent, which amount can be readily determined by one of ordinary skill employing routine experimentation. When hydrogen peroxide, it is typically added in an amount ranging between 1 and 15 weight percent, based upon the weight of the cellulosic pulp on a dry basis.

The acid neutralization and bleaching steps (step b and step c) can be carried out, either inside the same reactor, or inside any vessel (such as a dump tank) before isolation step d. These steps are generally conducted at temperatures in the range of 50° C. to 120° C., although higher or lower temperatures may be employed. When such step(s) are conducted at a temperature above 100° C. the alkali and oxidant need to be injected into the reactor or vessels. Typically the temperature is between 60° C. to 105° C., more typically it is between 70° C. and 105° C. The reaction time of step c can range from 1 minute or less to 180 minutes or more, and is typically between 5 minutes and 60 minutes.

It has been unexpectedly found that during the course of the bleaching step, the pH of the neutralized bleached product reaction mixture drops back into the acid range, a result which is both unexpected and particularly useful when an acid hydrolysis process is employed in step a, as this makes it easier to dewater the MCC wetcake formed by isolating the bleached microcrystalline cellulose in step d. Although not wishing to be held to any theory, it is believed that this change in pH is a result of the reaction of the alkaline oxidant with the hydrolysate liquid.

The bleached microcrystalline cellulose may be isolated from the bleached product reaction mixture by any means well known to one of skill in the art, typically by filtration, to obtain bleached microcrystalline cellulose in the form of a wetcake.

This wetcake which has been washed and/or filtered may be further processed. Such further processing may involve drying the material (typically by pray drying) or coprocessing the wetcake with hydrocolloid materials such as carboxymethyl cellulose.

The bleached microcrystalline cellulose produced by the method of this invention exhibits desirable color stability as well as compression characteristics suitable for pharmaceutical binder use. These traits are observed even when pulps having a lower alpha cellulose content than those dissolving pulps typically employed to produce microcrystalline cellulose are used as the starting material.

The MCC produced by the process of this invention is useful in food, nutrition, pharmaceutical, neutraceutical, industrial chemical, paints, latex, coatings, agrochemical, cosmetic, personal care, and toothpaste composition.

EXAMPLES

The following Examples are provided to illustrate the invention in accordance with the principles of this invention, but are not to be construed as limiting the invention in any way except as indicated in the appended claims.

Example 1

Employing a Paar Bomb Reactor, a low cost paper grade southern bleached softwood kraft (SBSK) pulp, having an alpha cellulose content of less than 92% was subjected to acid hydrolysis employing hydrochloric acid to form an acidic reaction product slurry. A first portion of such slurry was filtered, washed and spray dried to form "Unbleached MCC".

A second portion of the slurry was bleached as follows: 0.5% NaOH was added to the MCC slurry to adjust the pH to 12 before peroxide bleaching took place. The bleaching was done with 5% peroxide based on the cellulose weight, at 100 C° for 15 minutes. After this time, it was found that the pH of the slurry had acidified to pH 3. The bleached MCC slurry was filtered to isolate the MCC which was then washed with water and spray dried into MCC powder, "Bleached MCC".

The CIE whiteness and brightness of the Unbleached MCC and Bleached MCC was measured employing a Macbeth Colorimeter (Color-Eye 3100). The results of such measurements, along with those of a commercial MCC product (AVICEL PH 101) produced from a dissolving pulp are summarized in Table 1 below:

TABLE 1

| MCC | Whiteness | Brightness |
| --- | --- | --- |
| AVICEL PH101 | 75.2 | 85.6 |
| Unbleached MCC | 64.3 | 78.9 |
| Bleached MCC | 79.9 | 88.5 |

The above results demonstrate that the process of this invention permits the production of MCC from paper grade pulps having a whiteness and brightness comparable to that of commercial grade MCC produced from dissolving pulps.

The compaction of the Unbleached MCC and Bleached MCC produced above was evaluated employing a ESH compaction simulator under the following conditions on neat MCC materials: cycle duration 0.12 sec.; dwell time 6 ms; tablet weight 500 mg, round, flat, 13 mm diameter. Compression forces ranged from 3 kN to 18 kN, and the hardness was tested after 24 hours. The MCC compactability is the slope of table tensile strength (MPa) against the compacting pressure (MPa). The results of such evaluation, along with those of a commercial MCC product (AVICEL PH 101) produced from a dissolving pulp are summarized in Table 2.

TABLE 2

| MCC | Tablet Compactability Slope, $10^{-2}$ | Tensile Strength at 85 Mpa | Hardness At 11 kN |
| --- | --- | --- | --- |
| AVICEL PH101 | 7.9 | 6.0 | 380.3 |
| Unbleached MCC | 7.3 | 5.4 | 341.2 |
| Bleached MCC | 7.9 | 5.6 | 351.9 |

The results above show that bleached MCC produced using the process of this invention employing paper grade starting pulps exhibit compaction properties comparable to those of commercial MCC produced from high grade dissolving pulps.

One unexpected result of the alkaline bleaching process of this invention is that the pH of the bleached MCC/hydrolysate slurry becomes acidic once the bleaching is complete. This result makes it practical to the bleaching process of this invention in industrial production, because the final acidic pH aids the filtration and washing of the MCC to form wet cake, making it easier to dewater.

Example 2

Employing an acid hydrolysis process, an acidic product reaction slurry was produced having a pH 1.5. Aliquots of this slurry were treated as follows:
A) The slurry was neutralized to pH 7 by the addition of NaOH, and heated to 100 C°. Then additional NaOH, 0.5% was added to raise to pH 12, and immediately 5% peroxide was added for bleaching reaction by 15 minutes. The bleached MCC slurry (together with bleached hydrolyzate), was found to have a pH 4.
B) The slurry was filtered to produce an MCC wetake. The wetcake was washed so that it had a starting pH of 7. NaOH (0.5%) was added to rise the pH to 12, and 5% hydrogen peroxide added. The mixture was heated to 100° C. for 15 minutes, after which time the pH was 7-8, indicating that further reacidification would be needed to adequately dewater the bleached wetcake.
C) The slurry was filtered and the hydrolysate liquid, having an initial pH of 1.5 was recovered and was neutralized to pH 7 by the addition of NaOH, and heated to 100 C°. Then additional NaOH, 0.5% was added to raise to pH 12, and immediately 5% peroxide was added for bleaching reaction by 15 minutes. The bleached hydrolysate had a pH of 4.

This experiment further confirms the effectiveness of bleaching method of this invention. It demonstrates that the end pH drop to acidic range at the end of the bleaching, which unexpectedly enables the MCC dewatering/washing without the need for a further acidification step, is caused mainly by the peroxide reaction with the hydrolyzate component of the reaction mixture slurry.

Example 3

A low cost paper grade southern bleached softwood kraft (SBSK) pulp, having an alpha cellulose content of less than 92%, was subjected to electron beam (EB) pre-treatment of 5 MRad on a Dynamitron machine set at 4 MeV. After such pretreatment, the pulp was subjected to acid hydrolysis at the conditions set forth in Table 3 below; followed by bleaching (Example 3). As controls, the same pulp was subjected to acid hydrolysis without EB pretreatment (Comparative Experiment 3A); or subjected to EB pretreatment and acid hydrolysis (at the conditions set forth in Table 3) but not bleached (Comparative Experiment 3B). The whiteness of the MCC and its degree of polymerization (DP) were measured and are presented in Table 3 below.

TABLE 3

| Example or Comp. Expt. | EB Dose (4 MeV) | Pulp Whiteness | Pulp DP | MCC Hydrolysis Conditions | MCC Whiteness | MCC DP |
|---|---|---|---|---|---|---|
| 3A | 0 untreated | 72 | 1320 | 2.5% HCl, 100° C., 150 minutes. | 71.5 white | 255 |
| 3B | 5 MRad | 58 | 415 | 2.5% HCl, 100° C., 150 minutes. | 69 | 181 |
| 3 | 5 MRad | 58 | 415 | 1.2% acid, 100° C., 75 minutes, then, 5% peroxide 15 minutes. | 77 | 206 |

The above results show that the bleaching process of this invention can be applied to a starting pulp which has been electron-beam pretreated to produce MCC with substantially improved whiteness, using less acid chemicals and at a reduced reaction time.

Example 4

A low cost paper grade southern bleached softwood kraft (SBSK) pulp, having an alpha cellulose content of less than 92%, was treated with 10 MRad on a Dynamitron machine set at 4 MeV. The EB treated pulp, which had a whiteness of 45, was wet attrited to form a wet slurry; 0.5% NaOH and 5% hydrogen peroxide were added and the mixture heated to 100° C. for 15 minutes. The bleached MCC slurry was filtered/washed, oven dried and ground into MCC powder. The whiteness of the bleached MCC was 78; and its tablet compaction slope ($10^{-2}$) (measured as described in Example 1) was 7.1. This Example shows that the bleaching process of this invention may be applied to acidic product reaction mixture slurries produced employing an electron beam treatment.

What is claimed is:
1. A method of making microcrystalline cellulose comprising the steps of:
   a) Providing a cellulosic pulp and subjecting such pulp to an acid hydrolysis process to create an acidic product reaction mixture slurry comprising microcrystalline cellulose and a hydrolysate liquor;
   b) Adding a sufficient amount of an alkaline material to the acidic product reaction mixture slurry to produce a neutralized product reaction mixture having a pH of between 7 and 12, wherein the neutralized product reaction mixture comprises microcrystalline cellulose and a neutralized hydrolysate liquor;
   c) Adding oxidant to the neutralized product reaction mixture to form a bleached product reaction mixture comprising bleached microcrystalline cellulose and a bleached hydrolysate liquor, wherein the bleached product reaction mixture becomes acidic; and
   d) Isolating the bleached microcrystalline cellulose from the bleached product reaction mixture.
2. The method of claim 1 wherein the pulp possesses an alpha cellulose content of less than 92 weight percent.
3. The method of claim 2 wherein the pulp possesses an alpha cellulose content of less than 90 weight percent.

4. The method of claim 3 wherein the alkaline material is sodium hydroxide.

5. The method of claim 1 wherein the pulp is selected from the group consisting of bleached, semi-bleached, or unbleached Kraft pulps, high kappa Kraft pulp, bleached or unbleached sulfite pulps, soda cooking pulps, (organic) solvent pulping pulps, semi-chemical pulping pulps, fluff pulps, softwood pulps, hardwood pulps, Eucalyptus pulps, sawdust pulps, non-wood pulps, old corrugated container pulps, recycled paper pulps and mixtures thereof.

6. The method of claim 1 wherein the alkaline material is selected from the group consisting of sodium hydroxide, ammonia, potassium hydroxide, sodium carbonate, and calcium hydroxide, calcium oxide and mixtures thereof.

7. The method of claim 1 wherein the oxidant is selected from the group consisting of hydrogen peroxide, peroxy acids, peroxy esters, hydroperoxides, inorganic peroxides and organic peroxides, and mixtures thereof.

8. The method of claim 7 wherein the oxidant is hydrogen peroxide.

9. The method of claim 1 wherein step b is conducted at between 50° C. and 120° C.

10. The method of claim 9 wherein step b is conducted at between 60° C. and 105° C.

11. The method of claim 1 wherein step c is conducted at between 50° C. and 120° C.

12. The method of claim 11 wherein step c is conducted at between 60° C. and 105° C.

13. The method of claim 1 wherein step c is conducted for between 1 and 180 minutes.

14. The method of claim 13 wherein step c is conducted for between 5 and 60 minutes.

* * * * *